United States Patent
Wei

(10) Patent No.: US 9,654,315 B2
(45) Date of Patent: May 16, 2017

(54) SLICER APPARATUS AND CALIBRATION METHOD THEREOF

(71) Applicant: VIA Technologies, Inc., New Taipei (TW)

(72) Inventor: Yu-Chung Wei, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 14/990,799

(22) Filed: Jan. 8, 2016

(65) Prior Publication Data

US 2017/0070373 A1    Mar. 9, 2017

(30) Foreign Application Priority Data

Sep. 3, 2015  (TW) ............................. 104129148 A

(51) Int. Cl.
*H04L 25/03*  (2006.01)
*H04L 25/06*  (2006.01)

(52) U.S. Cl.
CPC ........ *H04L 25/03885* (2013.01); *H04L 25/06* (2013.01)

(58) Field of Classification Search
CPC .......................... H04L 25/03885; H04L 25/06
See application file for complete search history.

(56) References Cited

U.S. PATENT DOCUMENTS

| 7,729,453 | B1* | 6/2010 | Li | H03L 7/093 327/306 |
| 8,401,064 | B1* | 3/2013 | Lin | H04L 25/03267 375/229 |
| 8,417,752 | B1* | 4/2013 | Chan | H04B 3/04 708/205 |
| 8,654,830 | B1 | 2/2014 | Lin et al. | |
| 9,438,450 | B1* | 9/2016 | Kang | H04L 25/03057 |
| 2008/0240223 | A1* | 10/2008 | Badalone | H04L 25/03057 375/233 |
| 2012/0076181 | A1* | 3/2012 | Aziz | H04L 25/03057 375/219 |
| 2014/0023131 | A1* | 1/2014 | Sindalovsky | H04L 25/03343 375/232 |
| 2014/0270030 | A1 | 9/2014 | Hammad et al. | |
| 2015/0010121 | A1 | 1/2015 | Su | |
| 2015/0214911 | A1* | 7/2015 | Johnson | H03F 3/45941 330/2 |
| 2015/0312060 | A1* | 10/2015 | Sinha | H04L 25/03057 375/233 |
| 2015/0381393 | A1* | 12/2015 | Kotagiri | H04L 25/0307 375/233 |

OTHER PUBLICATIONS

Ellersick et al., "GAD: A 12-GS/s CMOS 4-bit A/D Converter for an Equalized Multi-Level Link ", 1999 IEEE Symposium on VLSI Circuits, 1999. Digest of Technical Papers, Jun. 17-19, 1999, pp. 49-52.

(Continued)

*Primary Examiner* — Kenneth Lam
(74) *Attorney, Agent, or Firm* — Jianq Chyun IP Office

(57) ABSTRACT

A slicer apparatus and a calibration method thereof are provided. A differential reference signal pair used for performing an error slicing operation is adjusted, so as to calibrate an offset voltage of the slicer apparatus.

20 Claims, 13 Drawing Sheets

(56) References Cited

OTHER PUBLICATIONS

Hong et al., "Offset Compensation in Comparators With Minimum Input-Referred Supply Noise", IEEE Journal of Solid-State Circuits, May 2004, pp. 837-840.
"Notice of Allowance of Taiwan Counterpart Application", issued on Nov. 17, 2016, p. 1-p. 4, in which the listed references were cited.

* cited by examiner

SLICER APPARATUS AND CALIBRATION METHOD THEREOF

CROSS-REFERENCE TO RELATED APPLICATION

This application claims the priority benefit of Taiwan application serial no. 104129148, filed on Sep. 3, 2015. The entirety of the above-mentioned patent application is hereby incorporated by reference herein and made a part of this specification.

BACKGROUND

Field of the Invention

The invention is directed to an electronic apparatus and more particularly, to a slicer apparatus and a calibration method thereof.

Description of Related Art

In a data transmission system, error slicers and data slicers are commonly used elements. For example, a data slicing circuit serves to compare an analog input signal with a reference level signal to determine a digit value (e.g., 0 or 1 of a binary value) represented by the input signal, i.e., the input originally in an analog form is transformed to an output signal in a digital form.

Generally, the error slicers and the data slicers usually have offset voltages generated due to unmatched transistors or other factors, and such offset voltages would lead the slicers to output incorrect data. To solve this issue, in a conventional slicer, current elements are disposed on an output path of the signal for compensating the offset voltage by means of a current difference. However, this method would cause reduced circuit performance due to load of the slicer becoming heavy, which leads a determination speed of the slicer to be slow.

SUMMARY

The invention provides a slicer apparatus and a calibration method thereof capable of effectively calibrating an offset voltage without affecting circuit performance.

According to an embodiment of the invention, a slicer apparatus including an equalizer, a positive voltage error slicer, a negative voltage error slicer, a first offset calibration unit and a second offset calibration unit is provided. The equalizer outputs an equalized differential output signal pair. The positive voltage error slicer is coupled to the equalizer and performs an error slicing operation on the equalized differential input signal pair according to a first differential reference signal pair, so as to output a first error slicing signal pair. The negative voltage error slicer is coupled to the equalizer and performs the error slicing operation on the equalized differential input signal pair according to a second differential reference signal pair, so as to output a second error slicing signal pair. The first offset calibration unit is coupled to the positive voltage error slicer and adjusts the first differential reference signal pair according to the first error slicing signal pair, so as to calibrate an offset voltage of the positive voltage error slicer. The second offset calibration unit is coupled to the negative voltage error slicer and adjusts the second differential reference signal pair according to the second error slicing signal pair, so as to calibrate the offset voltage of the negative voltage error slicer.

According to an embodiment of the invention, a calibration method of a slicer apparatus including a positive voltage error slicer and a negative voltage error slicer is provided. The method includes the following steps. An equalized differential output signal pair is output. A value of the equalized differential output signal pair is adjusted as an expected positive voltage value. An error slicing operation is performed on the equalized differential output signal pair according to the positive voltage differential reference signal pair by the positive voltage error slicer, so as to output a positive voltage error slicing signal pair. Whether a state of the positive voltage error slicing signal pair is transited is determined. If the state of the positive voltage error slicing signal pair is not transited, the positive voltage differential reference signal pair is adjusted according to the positive voltage error slicing signal pair, so as to calibrate an offset voltage of the positive voltage error slicer. If the state of the positive voltage error slicing signal pair is transited, a positive voltage error calibration value is stored, and the positive voltage differential reference signal pair is stopped from being adjusted. A value of the equalized differential output signal pair is adjusted as an expected negative voltage value. The error slicing operation is performed on the equalized differential output signal pair according to a negative voltage differential reference signal pair by the negative voltage error slicer, so as to output a negative voltage error slicing signal pair. Whether a state of the negative voltage error slicing signal pair is transited is determined. If the state of the negative voltage error slicing signal pair is not transited, the negative voltage differential reference signal pair is adjusted according to the negative voltage error slicing signal pair, so as to calibrate the offset voltage of the negative voltage error slicer. If the state of the negative voltage error slicing signal pair is transited, a negative voltage error calibration value is stored, and the negative voltage differential reference signal pair is stopped from being adjusted.

According to another embodiment of the invention, a calibration method of a slicer apparatus including a positive voltage error slicer, a negative voltage error slicer and a data slicer is provided. The calibration method includes the following steps. An equalized differential output signal pair is output. A value of the equalized differential output signal pair is adjusted to a value greater than an offset voltage of the data slicer. A data slicing operation is performed on the equalized differential output signal pair by the data slicer, so as to output a data slicing signal pair. Whether a state of data slicing signal pair is transited is determined. If the state of the data slicing signal pair is not transited, the equalized differential output signal pair is adjusted according to the data slicing signal pair, so as to calibrate the offset voltage of the data slicer. If the state of the data slicing signal pair is transited, the equalized differential output signal pair is stopped from being adjusted, and a positive voltage differential reference signal pair and a negative voltage differential reference signal pair are adjusted according to a calibration value for calibrating the equalized differential output signal pair, so as to calibrate the offset voltage of the data slicer. An error slicing operation is performed on the equalized differential output signal pair respectively according to the positive voltage differential reference signal pair and the negative voltage differential reference signal pair by the positive voltage error slicer and the negative voltage error slicer.

To sum up, in the invention, the differential reference signal pair for the error slicers performing the error slicing operation is adjusted to calibrate the offset voltages, such that the error slicers and the data slicer can output correct signals without affecting the circuit performance.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
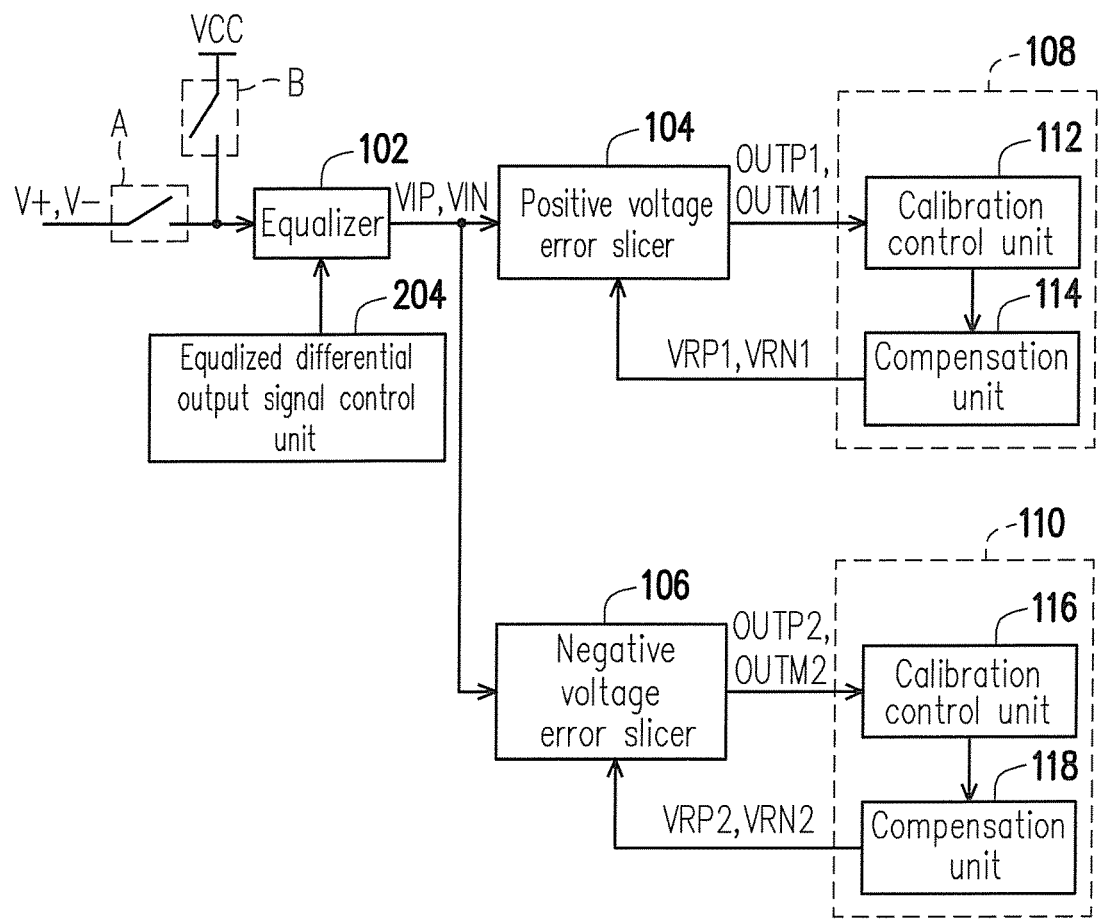
FIG. 1 is a schematic diagram illustrating a slicer apparatus according to an embodiment of the invention.

FIG. 1 is a schematic diagram illustrating a slicer apparatus according to an embodiment of the invention. Referring to FIG. 1, a slicer apparatus includes a switch A, a switch B, an equalizer 102, an equalized differential output signal control unit 204, a positive voltage error slicer 104, a negative voltage error slicer 106, an offset calibrating unit 108 and an offset calibrating unit 110. The switch A is coupled between a differential input signal pair (V+, V−) and the equalizer 102. The switch B is coupled between a common contact of the equalizer 102 and the switch A and the operation voltage VCC. The equalizer 102 is coupled with the positive voltage error slicer 104 and the negative voltage error slicer 106. The positive voltage error slicer 104 and the negative voltage error slicer 106 are further coupled to the offset calibrating unit 108 and the offset calibrating unit 110, respectively.

Figure 2:
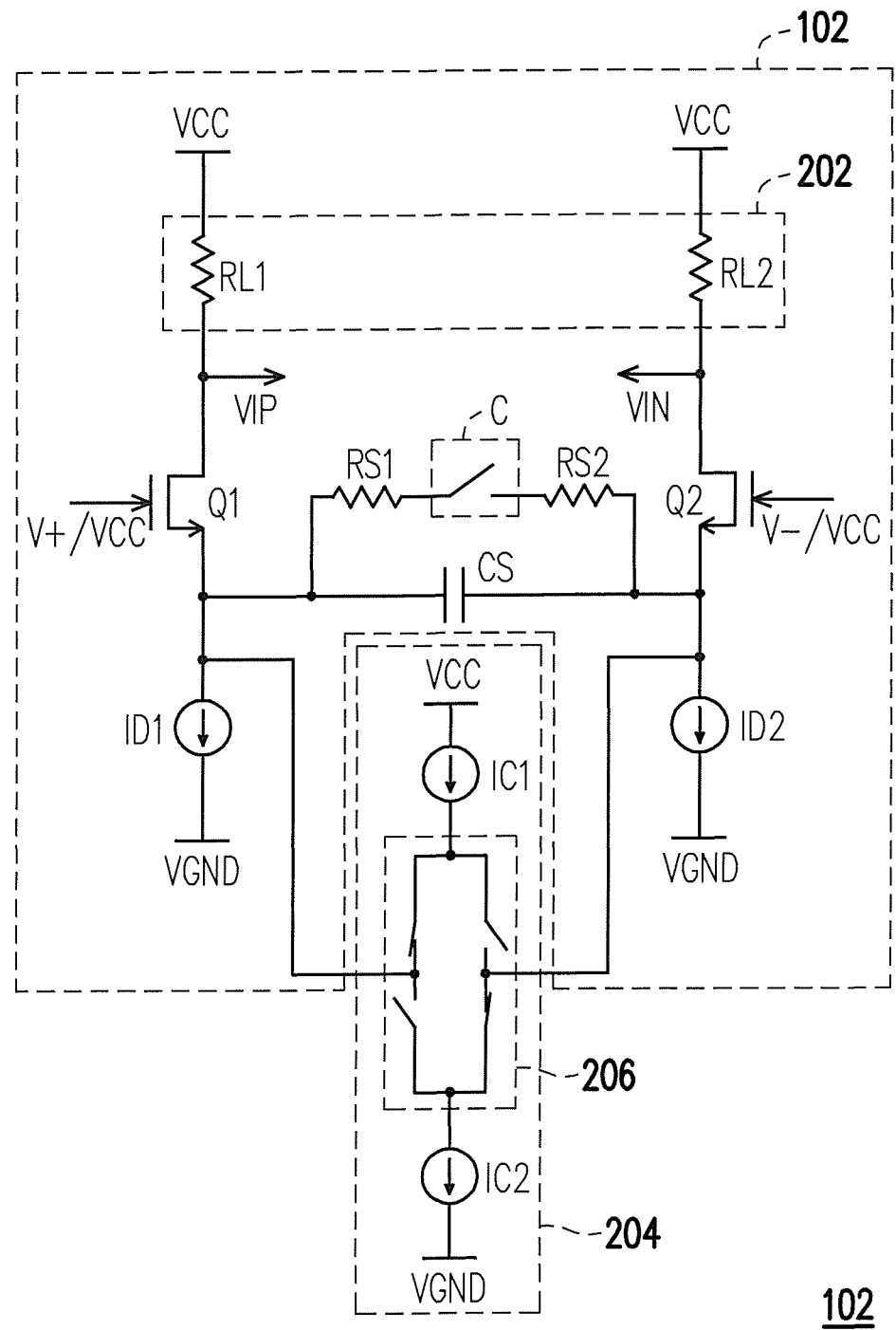
FIG. 2 is a schematic diagram illustrating the equalizer and the equalized differential output signal control unit according to an embodiment of the invention.

The equalizer 102 receives the differential input signal pair (V+, V−) through the switch A and receives an output current from the equalized differential output signal control unit 204. During a calibration process, the switch A is first turned off, and then the switch B is turned on, such that an operation voltage VCC is connected with a pair of differential input terminals (as shown in FIG. 2) of the equalizer 102 for calibration. Then, the equalized differential output signal control unit 204 provides or drains a current to or from the equalizer 102 to generate an equalized differential output signal pair (VIP, VIN) to the positive voltage error slicer 104 and the negative voltage error slicer 106. The positive voltage error slicer 104 performs an error slicing operation on the equalized differential output signal pair (VIP, VIN) according to a differential reference signal pair (VRP1, VRN1) to output an error slicing signal pair (OUTP1, OUTM1). The negative voltage error slicer 106 performs the error slicing operation on the equalized differential output signal pair (VIP, VIN) according to a differential reference signal pair (VRP2, VRN2) to output an error slicing signal pair (OUTP2, OUTM2). The differential reference signal pair (VRP1, VRN1) is generated by the offset calibrating unit 108, and the offset calibrating unit 108 adjusts the differential reference signal pair (VRP1, VRN1) according to the error slicing signal pair (OUTP1, OUTM1), so as to calibrate an offset voltage of the positive voltage error slicer 104. Similarly, the differential reference signal pair (VRP2, VRN2) is generated by the offset calibrating unit 110, and the offset calibrating unit 110 adjusts the differential reference signal pair (VRP2, VRN2) according to the error slicing signal pair (OUTP2, OUTM2), so as to calibrate an offset voltage of the negative voltage error slicer 106. In the present embodiment, the positive voltage error slicer 104 is configured to perform the error slicing operation on the equalized differential output signal pair (VIP, VIN) when the signal VIP minus the signal VIN is a positive voltage (e.g., when VIP−VIN=VREF, VREF is a predetermined positive voltage and serves as a reference voltage for calibrating the offset voltage of the positive voltage error slicer 104), while the negative voltage error slicer 106 is configured to perform the error slicing operation on the equalized differential output signal pair (VIP, VIN) when the signal VIP minus the signal VIN is a negative voltage (e.g., when VIP−VIN=−VREF, −VREF is a predetermined negative voltage and serves as a reference voltage for calibrating the offset voltage of the negative voltage error slicer 106).

Furthermore, the offset calibrating unit 108 includes a calibration control unit 112 and a compensation unit 114, and the offset calibrating unit 110 includes a calibration control unit 116 and a compensation unit 118. The calibration control unit 112 is coupled with the positive voltage error slicer 104 and the compensation unit 114, and the compensation unit 114 is further coupled to the positive voltage error slicer 104. The calibration control unit 116 is coupled with the negative voltage error slicer 106 and the compensation unit 118, and the compensation unit 118 is further coupled to the negative voltage error slicer 106. The calibration control unit 112 and the calibration control unit 116 may be implemented by means of logic circuits, for example. The calibration control unit 112 controls the compensation unit 114 to adjust the differential reference signal pair (VRP1, VRN1) according to the error slicing signal pair (OUTP1, OUTM1), so as to calibrate the offset voltage of the positive voltage error slicer 104. The calibration control unit 116 controls the compensation unit 118 to adjust the differential reference signal pair (VRP2, VRN2) according to the error slicing signal pair (OUTP2, OUTM2), so as to calibrate the offset voltage of the negative voltage error slicer 106. After the calibration operations of both the positive voltage error slicer 104 and the negative voltage error slicer 106 are completed, the switch A is turned on, and the switch B is turned off to perform the equalizing operation on the differential input signal pair (V+, V−). Namely, the equalizing operation is performed when the switch A is turned on, and the switch B is turned off, and the calibration operation is performed when the switch A is turned off, and the switch B is turned on.

FIG. 2 is a schematic diagram illustrating the equalizer and the equalized differential output signal control unit according to an embodiment of the invention. Referring to FIG. 2, in detail, the equalizer 102 includes, for example, a transistor pair (Q1, Q2), a load unit 202, draining current sources ID1 and ID2, resistors RS1 and RS2, a switch C and a capacitor CS. Input terminals of the transistor pair (Q1, Q2) receive the differential input signal pair (V+, V−) or operation voltage VCC. The load unit 202 is coupled between output terminals of the transistor pair (Q1, Q2) and the operation voltage VCC. In the present embodiment, the load unit 202 is implemented by means of resistors RL1 and RL2, but the invention is not limited thereto. The resistors RL1 is coupled between a drain of the transistor Q1 and the operation voltage VCC, while the resistor RL2 is coupled between a drain of the transistor Q2 and the operation voltage VCC. Additionally, the resistors RS1, RS2 and the switch C are serially connected between sources of the transistors Q1 and Q2, the switch C is coupled between the resistors RS1 and RS2, and the capacitor CS is coupled between the sources of the transistors Q1 and Q2. Further, the draining current source ID1 is coupled between the source of the transistor Q1 and a ground voltage VGND, the draining current source ID2 is coupled between the source of the transistor pair Q2 and the ground voltage VGND, and the equalized differential output signal control unit 204 is coupled between the sources of the transistor pair (Q1, Q2). According to FIG. 1 and FIG. 2, when the switch A is turned off, the switch B is turned on, and the switch C is turned off, during the calibration operation, the current ID1 flows through the resistor RL1 to generate the equalized differential output signal VIP, the current ID2 flows through the resistor RL2 to generate the equalized differential output signal VIN, and the equalized differential output signal control unit 204 provides or drains the current to or from the sources of the transistor pair (Q1, Q2) to change the currents flowing through the transistor pair (Q1, Q2), so as to adjust the equalized differential output signal pair (VIP, VIN), for example, to achieve the value of the signal VIP minus the signal VIN equaling the predetermined positive voltage VREF or the value the signal VIP minus the signal VIN equaling the predetermined negative voltage −VREF.

To be detailed, the equalized differential output signal control unit 204 may include, for example, current sources IC1 and IC2 and a switching unit 206. The current source IC1 is coupled between the operation voltage VCC and the switching unit 206, and the current source IC2 is coupled between the switching unit 206 and the ground voltage VGND. The switching unit 206 switches a coupling state thereof to change the currents flowing through the transistor pair (Q1, Q2). The switching unit 206 also couples the transistor Q2 to the current source IC2 (as shown in FIG. 2) simultaneously when coupling the transistor Q1 to the current source IC1; otherwise, the switching unit 206 couples the transistor Q2 to the current source IC1 simultaneously when coupling the transistor Q1 to the current source IC2. Through switching the coupling state between the current sources IC1, IC2 and the transistor pair (Q1, Q2), the switching unit 206 may induce the equalized differential output signal pair (VIP, VIN) to provide the predetermined positive voltage VREF or the predetermined negative voltage −VREF. In this way, the equalized differential output signal control unit 204 disposed between the sources of the transistor pair (Q1, Q2) may control the equalized differential output signal pair (VIP, VIN) output by the equalizer 102 to avoid a bandwidth drop due to the increase in the load of the output terminal of the equalizer 102. On the other hand, when the switch A is turned on, the switch B is turned off, and the switch C is turned on, the equalizing operation is performed.

Figure 3:
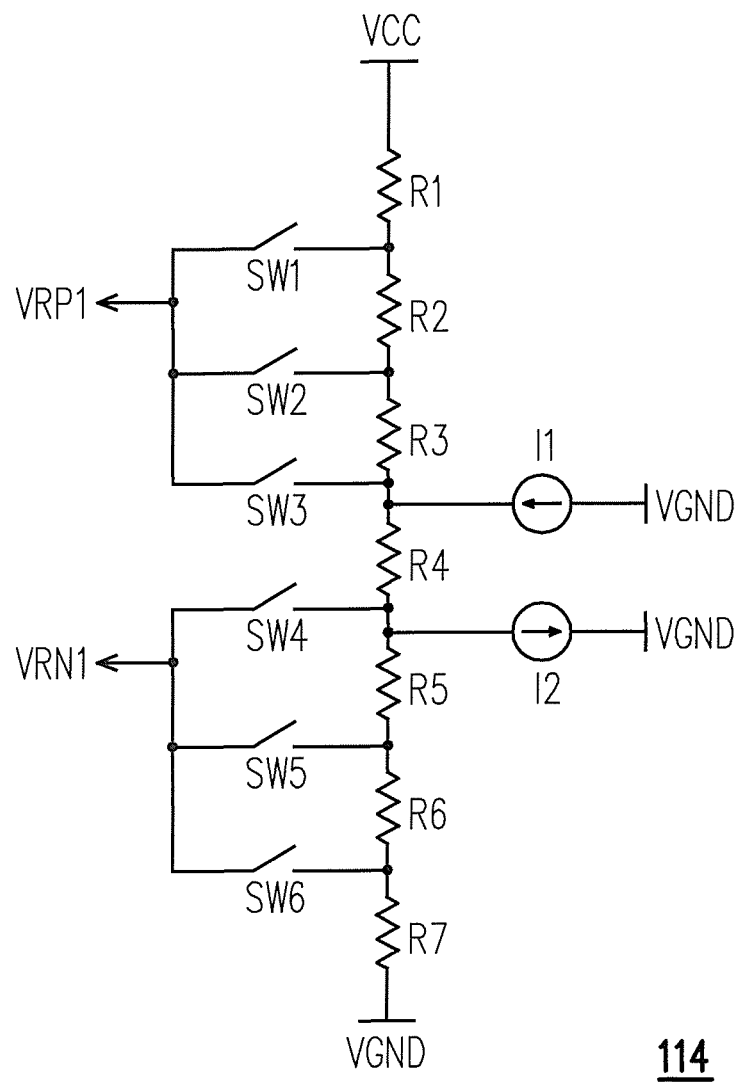
FIG. 3 is a schematic diagram illustrating the compensation unit according to an embodiment of the invention.

FIG. 3 is a schematic diagram illustrating the compensation unit 114 according to an embodiment of the invention. Referring to FIG. 3, to be detailed, the compensation unit 114 includes, for example, a plurality of voltage-dividing resistors R1 to R7, a plurality of switches SW1 to SW6, a current source I1 and a current source I2. The voltage-dividing resistors R1 to R7 are serially connected between the operation voltage VCC and the ground voltage VGND, each of the switches SW1 to SW6 is coupled between the positive voltage error slicer 104 and a common contact of two corresponding voltage-dividing resistors. For example, the switch SW1 is coupled between the positive voltage error slicer 104 and a common contact of the voltage-dividing resistors R1 and R2, the coupling manners of the switches SW2 to SW6 may be deduced in the same way and will not be repeatedly described. Each of the current sources I1 and I2 is coupled between a common contact of two corresponding voltage-dividing resistors and the ground voltage VGND. For example, in the present embodiment, the current source I1 is coupled between a common contact of the voltage-dividing resistors R3 and R4 and the ground voltage VGND, and the current source I2 is coupled between a common contact of the voltage-dividing resistors R4 and R5 and the ground voltage VGND. It should be noted that the number of the voltage-dividing resistors and the number of the switches are not limited to the numbers mentioned in the present embodiment, and in other embodiments, the compensation unit 114 may include more or fewer voltage-dividing resistors as well as more or fewer corresponding voltage-dividing resistors switches thereof. Additionally, the current sources I1 and I2 may also be coupled to the common contacts of different voltage-dividing resistors and are not limited to be coupled to the common contact of the voltage-dividing resistors R3 and R4 or the common contact of the voltage-dividing resistors R4 and R5. Additionally, the switches SW1 to SW6 may be implemented by means of transistors, but the invention is not limited thereto.

Furthermore, the calibration control unit 112 is coupled with switches SW1 to SW6 and the current sources I1 and I2. The calibration control unit 112 controls conduction states of the switches SW1 to SW6 and current sizes of the current sources I1 and I2 according to the error slicing signal pair (OUTP1, OUTM1) output by the positive voltage error slicer 104, so as to control the compensation unit 114 to output the differential reference signal pair (VRP1, VRN1) having different voltage levels. If the voltage level of the differential reference signal pair (VRP1, VRN1) output by the compensation unit 114 is low in a scenario that the switches SW3 and SW4 are turned on, and the other switches are turned off, it may be changed to the switches SW2 and SW5 being turned on, and the other switches being turned off, so as to increase the voltage level of the differential reference signal pair (VRP1, VRN1). In addition, the calibration control unit 112 may also fine tune the differential reference signal pair (VRP1, VRN1) output by the compensation unit 114 through controlling the current sizes of the current sources I1 and I2.

Figure 4:
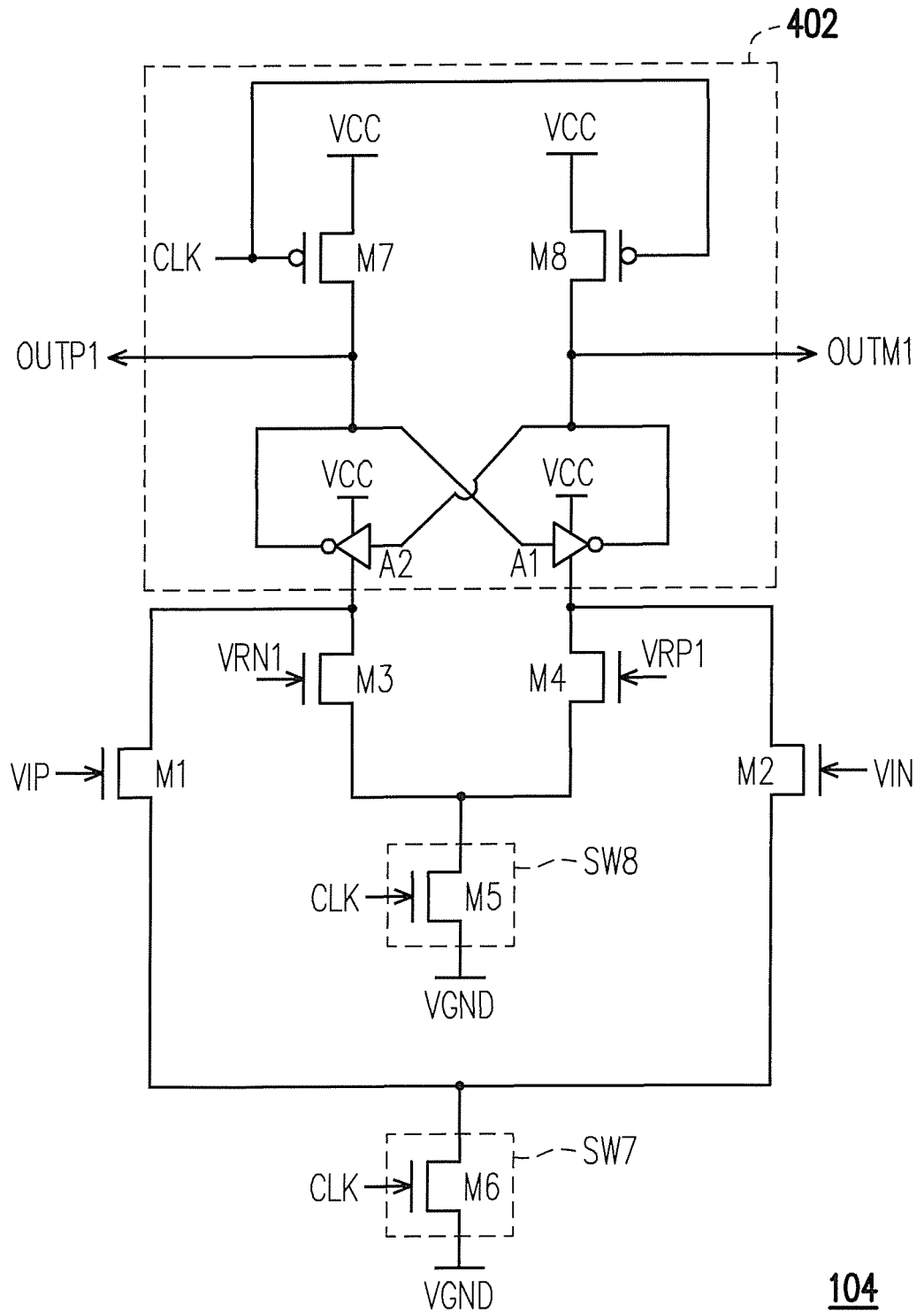
FIG. 4 is a schematic diagram illustrating an error slicer according to an embodiment of the invention.

Furthermore, the positive voltage error slicer 104 may be implemented in a manner illustrated in FIG. 4. The positive voltage error slicer 104 includes an active load unit 402, a differential transistor pair (M1, M2), a differential transistor pair (M3, M4) and switches SW7 and SW8. Input terminals of the differential transistor pair (M1, M2) respectively receive the equalized differential output signal pair (VIP, VIN), and output terminals of the differential transistor pair (M1, M2) are coupled to active load unit 402, a common terminal of the differential transistor pair (M1, M2) is coupled to the ground voltage VGND through the switch SW7. Input terminals of the differential transistor pair (M3, M4) respectively receive the differential reference signal pair VRN1 and VRP1 s of the differential transistor pair (M1, M2), and a common terminal of the differential transistor pair (M3, M4) is coupled to the ground voltage VGND through the switch SW8. Meanwhile, conduction states of the switches SW7 and SW8 are controlled by a clock signal CLK. In the present embodiment, the switches SW7 and SW8 are implemented by means of transistors M6 and M5, but the invention is not limited thereto. Additionally, in some embodiments, the differential reference signal VRP1 and the equalized differential output signal VIN provided by the equalizer 102 may be exchanged. Additionally, in the present embodiment, the active load unit 402 is implemented by means of transistors M7 and M8 and inverters A1, A2. Input terminals of the transistors M7 and M8 receive the clock signal CLK, and sources of the transistor M7 and M8 are coupled to the operation voltage VCC. An input terminal and an output terminal of the inverter A1 are respectively coupled with a drain of the transistor M7 and a drain of the transistor M8, an input terminal and an output terminal of the inverters A2 are respectively coupled with the drain of the transistor M8 and the drain of the transistor M7, first power supply tell finals of both the inverters A1 and A2 receive the operation voltage VCC, a second power supply terminal of the inverter A1 is coupled to a drain of the transistor M4, and a second power supply terminal of the inverters A2 is coupled to a drain of the transistor M3.

Figure 5:
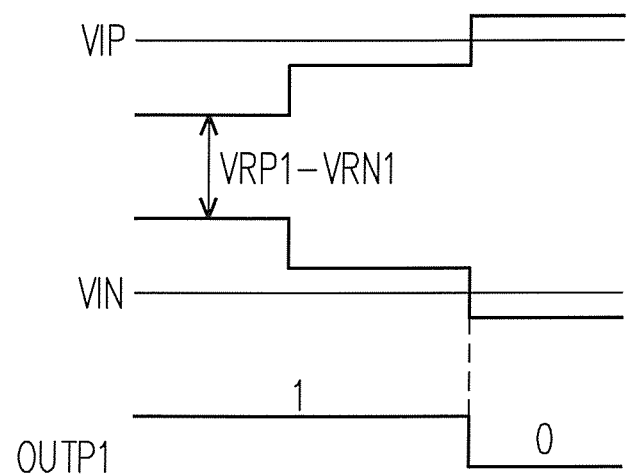
FIG. 5 is a schematic waveform graph illustrating signals according to an embodiment of the invention.

As described in the embodiments above, the positive voltage error slicer 104 is configured to perform the error slicing operation on the equalized differential output signal pair (VIP, VIN) when the signal VIP minus the signal VIN is the positive voltage, and in the present embodiment, the signal VIP provided by the equalizer 102 minus the signal VIN is the positive voltage (e.g., the aforementioned pre-determined positive voltage VREF which serves as the reference voltage for calibrating the offset voltage of the positive voltage error slicer 104). The calibration control unit 112 controls the compensation unit 114 to adjust the voltage level of the differential reference signal pair (VRP1, VRN1) according to the error slicing signal pair (OUTP1, OUTM1) output by the positive voltage error slicer 104, so as to calibrate the offset voltage of the positive voltage error slicer 104. For example, referring to FIG. 5, if it is assumed that values of the error slicing signal pair (OUTP1, OUTM1) output by the positive voltage error slicer 104 are "1" and "0", respectively, the calibration control unit 112 may control the compensation unit 114 to gradually increase a voltage level of the signal VRP1 and synchronously decrease a voltage level of the signal VRN1, so as to examine whether the values of the error slicing signal pair (OUTP1, OUTM1) output by the positive voltage error slicer 104 are respectively transited to "0" and "1". When a value of the error slicing signal pair (OUTP1, OUTM1) is transited to "0" and "1", respectively, the calibration control unit 112 may control the compensation unit 114 to stop increasing the voltage level of the signal VRP1 and synchronously stop decreasing the voltage level of the signal VRN1, so as to complete the calibration of the offset voltage of the positive voltage error slicer 104.

Similarly, the compensation unit 118 may also be implemented in a manner similar to that illustrated in FIG. 3. Since the negative voltage error slicer 106 is configured to perform the error slicing operation on the equalized differential output signal pair (VIP, VIN) when the signal VIP minus the signal VIN is the negative voltage, in the scenario that the compensation unit 118 is implemented in the manner illustrated in FIG. 3, the output terminal originally configured to output the signal VRP1 is changed to output the signal VRN2, and the output terminal originally configured to output the signal VRN1 is changed to output the signal VRP2. Moreover, the negative voltage error slicer 106 may also be implemented in a manner similar to that illustrated in FIG. 4, and the persons with ordinary skills of the art may deduce the operation of the present embodiment with reference to the descriptions set forth above and thus, will not be repeated.

Figure 6:
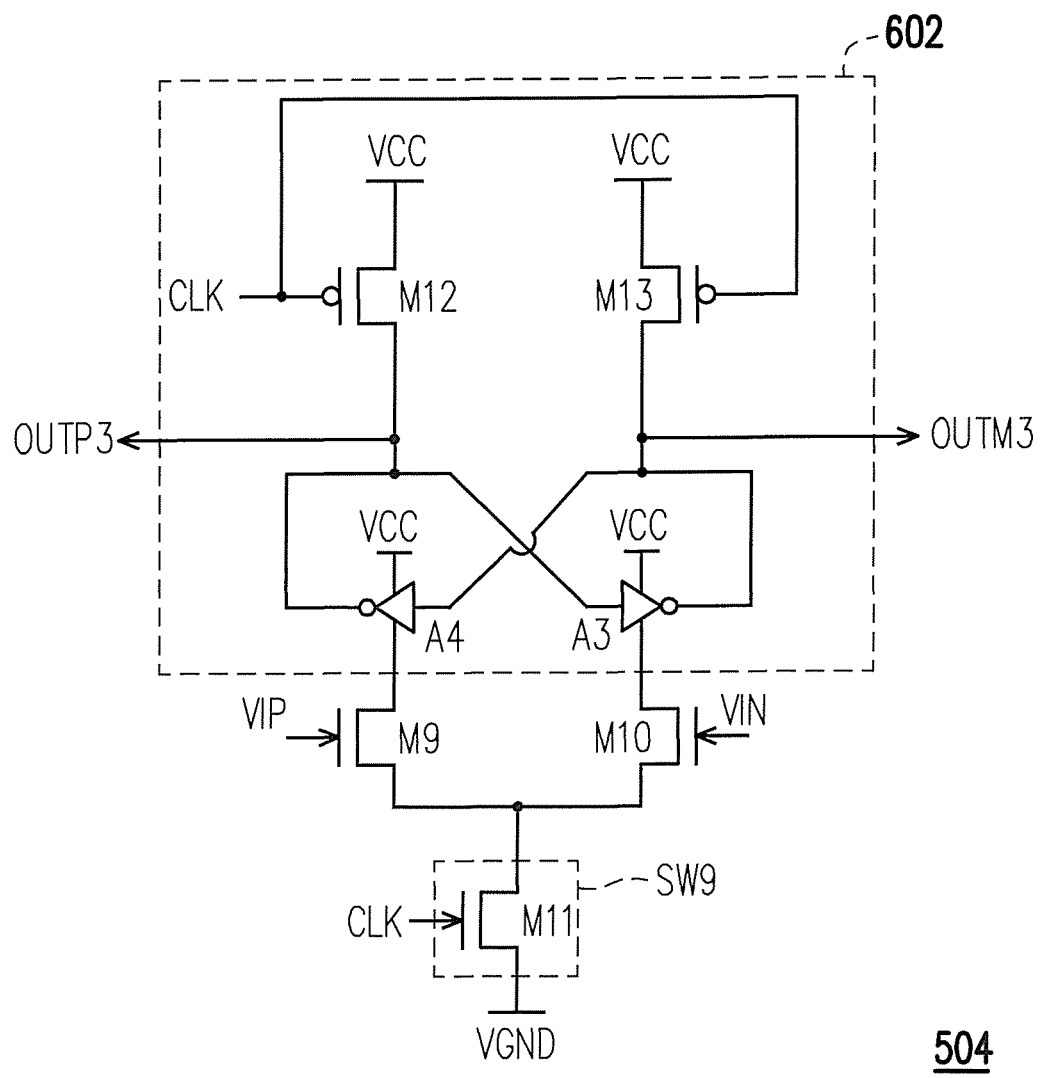
FIG. 6 is a schematic diagram illustrating a data slicer according to an embodiment of the invention.

FIG. 6 is a schematic diagram illustrating a data slicer according to an embodiment of the invention. To be detailed, a data slicer 504 includes, for example, an active load unit 602, a differential transistor pair (M9, M10) and a switch SW9. Input terminals of the differential transistor pair (M9, M10) respectively receive the equalized differential output signal pair (VIP, VIN), output terminals of the differential transistor pair (M9, M10) are coupled to the active load unit 602, and a common terminal of the differential transistor pair (M9, M10) is coupled to the ground voltage VGND through the switch SW9. A conduction state of the switch SW9 is controlled by the clock signal CLK, and the switch SW9 may be implemented by means of a transistor M11 in the present embodiment, but the invention is not limited thereto. Additionally, in the present embodiment, the active load unit 602 is implemented by means of transistors M12, M13 and inverters A3, A4. Input terminals of the transistors M12 and M13 respectively receive the clock signal CLK, and sources of the transistors M12 and M13 are coupled to the operation voltage VCC. First power supply terminals of both the inverters A3 and A4 receive the operation voltages VCC, a second power supply terminal of the inverter A3 is coupled to a drain of the transistor M10, a second power supply terminal of the inverter A4 is coupled to a drain of the transistor M9, an input terminal and an output terminal of the inverter A3 are respectively coupled to a drain of the transistor M12 and a drain of the transistor M13, and an input terminal and an output terminal of the inverters A4 are respectively coupled to a drain of the transistor M13 and a drain of the transistor M12.

Figure 7:
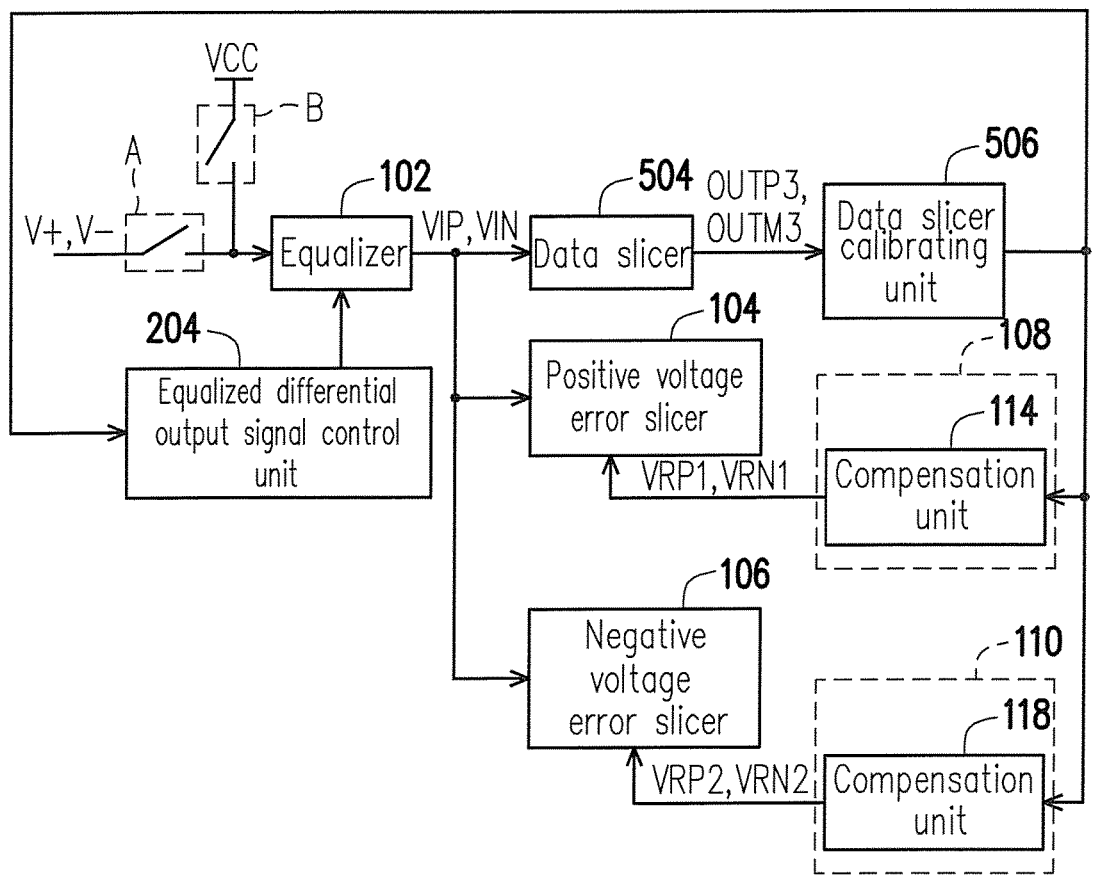
FIG. 7 is a schematic diagram illustrating a slicer apparatus according to another embodiment of the invention.

FIG. 7 is a schematic diagram illustrating a slicer apparatus according to another embodiment of the invention. Referring to FIG. 7, a slicer apparatus of the present embodiment is different from the slicer apparatus illustrated in FIG. 1 that the slicer apparatus of the present embodiment further includes the data slicer 504 and a data slicer calibrating unit 506. The data slicer 504 is coupled with the equalizer 102 and the data slicer calibrating unit 506, and the data slicer calibrating unit 506 is further coupled to the equalized differential output signal control unit 204, the compensation unit 114 and the compensation unit 118. The data slicer 504 is configured to perform a data slicing operation on the equalized differential output signal pair (VIP, VIN) to output a data slicing signal pair (OUTP3, OUTM3). Furthermore, the data slicer calibrating unit 506 may be coupled with each switch and each current source in the compensation units 114 and 116 and control the differential reference signal pair (VRP1, VRN1) and a differential reference signal pair (VRP2, VRN2) output by the compensation units 114 and 116. Additionally, in the present embodiment, the offset calibrating unit 108 and the offset calibrating unit 110 may not have to include the calibration control unit 112 and the calibration control unit 116. In other words, in the present embodiment, the positive voltage error slicer 104 and the negative voltage error slicer 106 do not have to be calibrated, and the data slicer calibrating unit 506 may control the equalized differential output signal control unit 204 to adjust the equalized differential output signal pair (VIP, VIN) output by the equalizer 102 directly according to the data slicing signal pair (OUTP3, OUTM3) output by the data slicer 504, and control the compensation unit 114 and the compensation unit 118 to adjust the differential reference signal pair (VRP1, VRN1) and the differential reference signal pair (VRP2, VRN2) corresponding thereto according to calibration value of the equalized differential output signal pair (VIP, VIN) corresponding to the data slicing signal pair (OUTP3, OUTM3) when being transited, so as to calibrate an offset voltage of the data slicer 504.

After the compensation unit 114 and the compensation unit 118 respectively calibrate the offset voltage of the positive voltage error slicer 104 and the offset voltage of the negative voltage error slicer 106, the data slicer calibrating unit 506 controls the equalized differential output signal control unit 204 to adjust the equalized differential output signal pair (VIP, VIN) output by the equalizer 102 according to the data slicing signal pair (OUTP3, OUTM3) output by the data slicer 504. For example, the data slicer calibrating unit 506 may control current sizes of the current sources IC1 and IC2 illustrated in FIG. 2 and the coupling state of the switching unit 206 through the equalized differential output signal control unit 204 to adjust a voltage level of the equalized differential output signal pair (VIP, VIN). When determining that the state of the data slicing signal pair (OUTP3, OUTM3) are transited, the data slicer calibrating unit 506 stops adjusting the equalized differential output signal pair (VIP, VIN) and controls the compensation unit 114 and the compensation unit 118 to adjust the differential reference signal pair (VRP1, VRN1) and the differential reference signal pair (VRP2, VRN2) corresponding thereto in an opposite direction according to a calibration value output by the data slicer calibrating unit 506, so as to calibrate the offset voltage of the data slicer 504.

Figure 8:
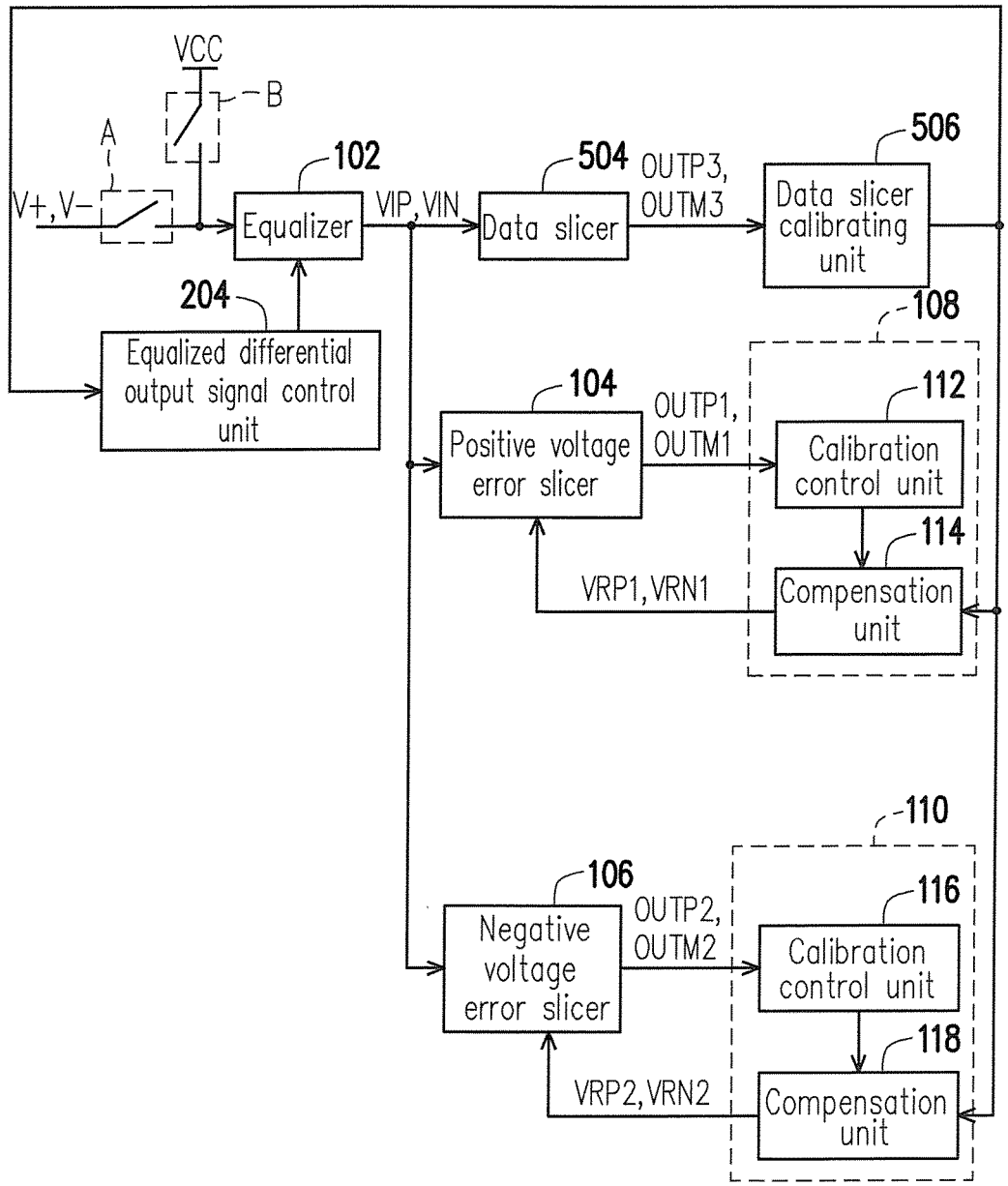
FIG. 8 is a schematic diagram illustrating a slicer apparatus according to yet another embodiment of the invention.

FIG. 8 is a schematic diagram illustrating a slicer apparatus according to yet another embodiment of the invention. Referring to FIG. 8, a slicer apparatus of the present embodiment is different from the slicer apparatus illustrated in FIG. 7 that the offset calibrating unit 108 and the offset calibrating unit 110 of the slicer apparatus of the present embodiment further include calibration control units 112 and 116, respectively. When the calibration of the data slicer 504 is completed, a calibration value corresponding to the positive voltage error slicer 104 is obtained by performing positive and negative values inversion on a calibration value (which may be, for example, a voltage adjustment value of the equalized differential output signal pair (VIP, VIN)) corresponding to the data slicing signal pair (OUTP3, OUTM3) when being transited and then added the inverted calibration value with a calibration value (which may be, for example, a voltage adjustment value of the differential reference signal pair (VRP1, VRN1)) corresponding to the error slicing signal pair (OUTP1, OUTM1) when being transited. Similarly, a calibration value corresponding to the negative voltage error slicer 106 is obtained by multiplying the calibration value of the equalized differential output signal pair (VIP, VIN) corresponding to the data slicing signal pair (OUTP3, OUTM3) when being transited with a negative sign and then added the resulting value with a calibration value (which may be, for example, a voltage adjustment value of the differential reference signal pair (VRP2, VRN2)) corresponding to the error slicing signal pair (OUTP2, OUTM2) when being transited. The other operation details are similar to the operation of the embodiment illustrated in FIG. 7, and the persons with ordinary skills of the art may deduce the operation of the present embodiment with reference to the descriptions set forth above and thus, will not be repeated.

Figure 9:
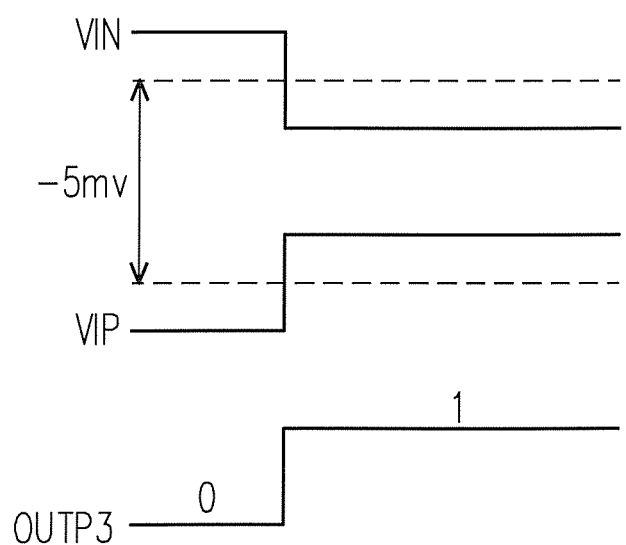
FIG. 9 is a schematic waveform graph illustrating the equalized differential output signal pair according to an embodiment of the invention.

FIG. 9 is a schematic waveform graph illustrating the equalized differential output signal pair according to an embodiment of the invention. For example, a calibration result of the data slicer 504 may be the equalized differential output signal pair of the embodiment illustrated in FIG. 9. Taking the signal OUTP3 for example, it is assumed that in the present embodiment, an offset voltage input by the data slicer is −5 mV, and when the voltage level of the signal VIP minus the voltage level of VIN is greater than −5 mV, the signal OUTP3 is transited from "0" to "1" (when the signal VIP is greater than the signal VIN, the value of the signal OUTP3 is "1"). The data slicer calibrating unit 506 may control the equalized differential output signal control unit 204 to adjust the equalized differential output signal pair (VIP, VIN) (i.e., a difference value of the level of the signal VIP minus the level of the signal VIN) output by the equalizer 102, so as to induce the signal OUTP3 output by the data slicer 504 to be transited from "0" to "1". When the signal OUTP3 is transited from "0" to "1", the data slicer calibrating unit 506 may calibrate the positive voltage error slicer 104 according to the calibration value currently corresponding to the equalized differential output signal pair (VIP, VIN) which is multiplied by the negative sign and added with the calibration value of the differential reference signal pair (VRP1, VRN1) corresponding to the error slicing signal pair (OUTP1, OUTM1) having positive voltages when being transited, and calibrate the negative voltage error slicer 106 according to the calibration values corresponding to the equalized differential output signal pair (VIP, VIN) which are multiplied by the negative sign and added with the calibration value of the differential reference signal pair (VRP2, VRN2) corresponding to the error slicing signal pair (OUTP2, OUTM2) when being transited.

Referring to FIG. 7 and FIG. 8, the data slicer calibrating unit 506 controls the equalized differential output signal control unit 204 to adjust the equalized differential output signal pair (VIP, VIN) according to the data slicing signal pair (OUTP3, OUTM3) in this way, and the data slicer calibrating unit 506 controls the compensation units 114 and 118 to adjust the differential reference signal pair (VRP1, VRN1) which is output to the positive voltage error slicer 104 and the differential reference signal pair (VRP2, VRN2) which is output to the negative voltage error slicer 106 to calibrate the offset voltage of the data slicer 504. Thereby, the compensation of the offset voltages does not have to be performed through disposing current elements (or capacitor elements) on the output terminals of the data slicer as the way implemented in the conventional art, such that neither the reduction of the circuit performance occurs due to increase to the output terminals of the data slicer 504, nor a determination speed of the data slicer 504 is decreased.

Figure 10:
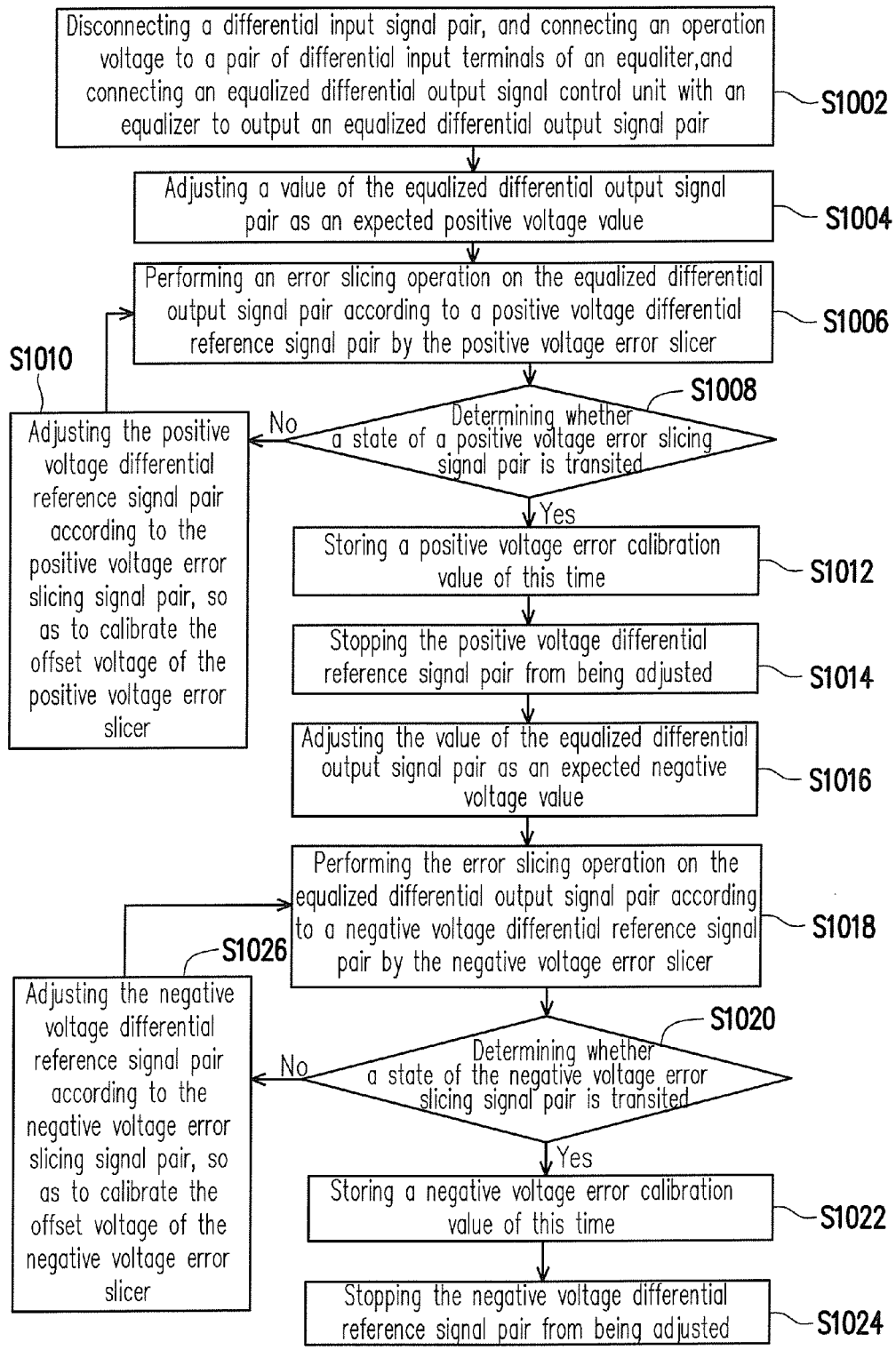
FIG. 10 is a flowchart illustrating a calibration method of the slicer apparatus according to an embodiment of the invention.

FIG. 10 is a flowchart illustrating a calibration method of the slicer apparatus according to an embodiment of the invention. In the present embodiment, the slicer apparatus includes the positive voltage error slicer and the negative voltage error slicer. According to the descriptions of the embodiments above, a calibration method of the error slicer apparatus includes the following steps. First, the differential input signal pair is disconnected and an operation voltage is connected to a pair of differential input terminals of an equalizer, and the equalized differential output signal control unit is connected with the equalizer to output the equalized differential output signal pair (step S1002). Then, a value the equalized differential output signal pair is adjusted as an expected positive voltage value (step S1004) by means of, for example, inducing the signal VIP minus the signal VIN equaling the predetermined positive voltage VREF, as described in the embodiment illustrated in FIG. 2. Then, the error slicing operation is performed on the equalized differential output signal pair according to the positive voltage differential reference signal pair by the positive voltage error slicer (step S1006), so as to output a positive voltage error slicing signal pair. Then, whether the positive voltage error slicing signal pair is transited is determined (step S1008). If the positive voltage error slicing signal pair is not transited, the positive voltage differential reference signal pair is adjusted according to the positive voltage error slicing signal pair, so as to calibrate the offset voltage of the positive voltage error slicer (step S1010), and returning to step S1006, the error slicing operation continues to be performed on the equalized differential output signal pair according to the positive voltage differential reference signal pair by the positive voltage error slicer. On the contrary, if the positive voltage error slicing signal pair is transited, a positive voltage error calibration value is stored at this time (step S1012). Then, the positive voltage differential reference signal pair is stopped from being adjusted (step S1014). Then, the value of the equalized differential output signal pair is adjusted as an expected negative voltage value (step S1016), by means of, for example, inducing signal VIP minus the signal VIN equaling the predetermined negative voltage −VREF, as described in the embodiment illustrated in FIG. 2. Then, the error slicing operation is performed on the equalized differential output signal pair according to the negative voltage differential reference signal pair by the negative voltage error slicer (step S1018), so as to generate the negative voltage error slicing signal pair. Thereafter, whether the negative voltage error slicing signal pair is transited is determined (step S1020). If the negative voltage error slicing signal pair is transited, a negative voltage error calibration value is stored at this time (step S1022). Then, the negative voltage differential reference signal pair is stopped from being adjusted (step S1024). On the contrary, if the negative voltage error slicing signal pair is not transited, the negative voltage differential reference signal pair is adjusted according to the negative voltage error slicing signal pair, so as to calibrate the offset voltage of the negative voltage error slicer (step S1026), and returning to step S1018, the error slicing operation continues to be performed on the equalized differential output signal pair according to the negative voltage differential reference signal pair by the negative voltage error slicer.

Figure 11:
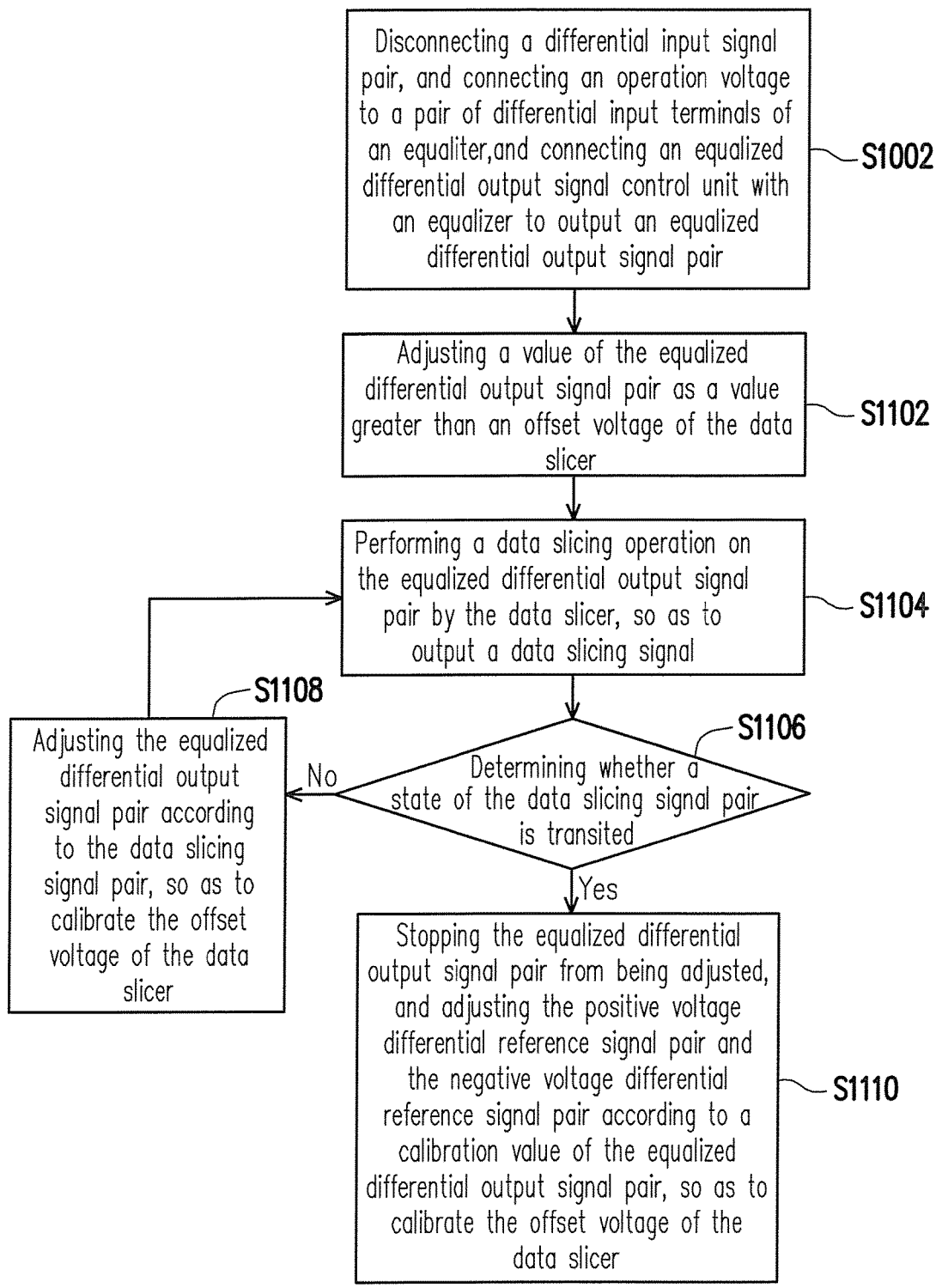
FIG. 11 is a flowchart illustrating a calibration method of the slicer apparatus according to another embodiment of the invention.

It should be noted that in some embodiments, the calibration may be directly performed on the data slicer, instead of on the positive voltage error slicer and the negative voltage error slicer. Referring to FIG. 11, FIG. 11 is a flowchart illustrating another process of the calibration method of the slicer apparatus. In comparison with the embodiment illustrated in FIG. 10, in the embodiment illustrated in FIG. 11, step S1102 is directly entered after step S1002, where a value of the equalized differential output signal pair is adjusted as a value greater than the offset voltage of the data slicer. Then, the data slicing operation is performed on the equalized differential output signal pair by the data slicer, so as to output the data slicing signal pair (step S1104). Thereafter, whether the data slicing signal pair is transited is determined (step S1106). If the data slicing signal pair is not transited, the equalized differential output signal pair is adjusted according to the data slicing signal pair, so as to calibrate the offset voltage of the data slicer (step S1108), and then returning to step S1104, the data slicing operation is performed on the equalized differential output signal pair. On the contrary, if the data slicing signal pair is transited, the equalized differential output signal pair is stopped from being adjusted, and the positive voltage differential reference signal pair and the negative voltage differential reference signal pair are adjusted according to a calibration value of the equalized differential output signal pair, so as to calibrate the offset voltage of the data slicer (step S1110). The error slicing operation is performed on the equalized differential output signal pair according to the positive voltage differential reference signal pair by the positive voltage error slicer and according to the negative voltage differential reference signal pair by the negative voltage error slicer respectively.

Figure 12A:
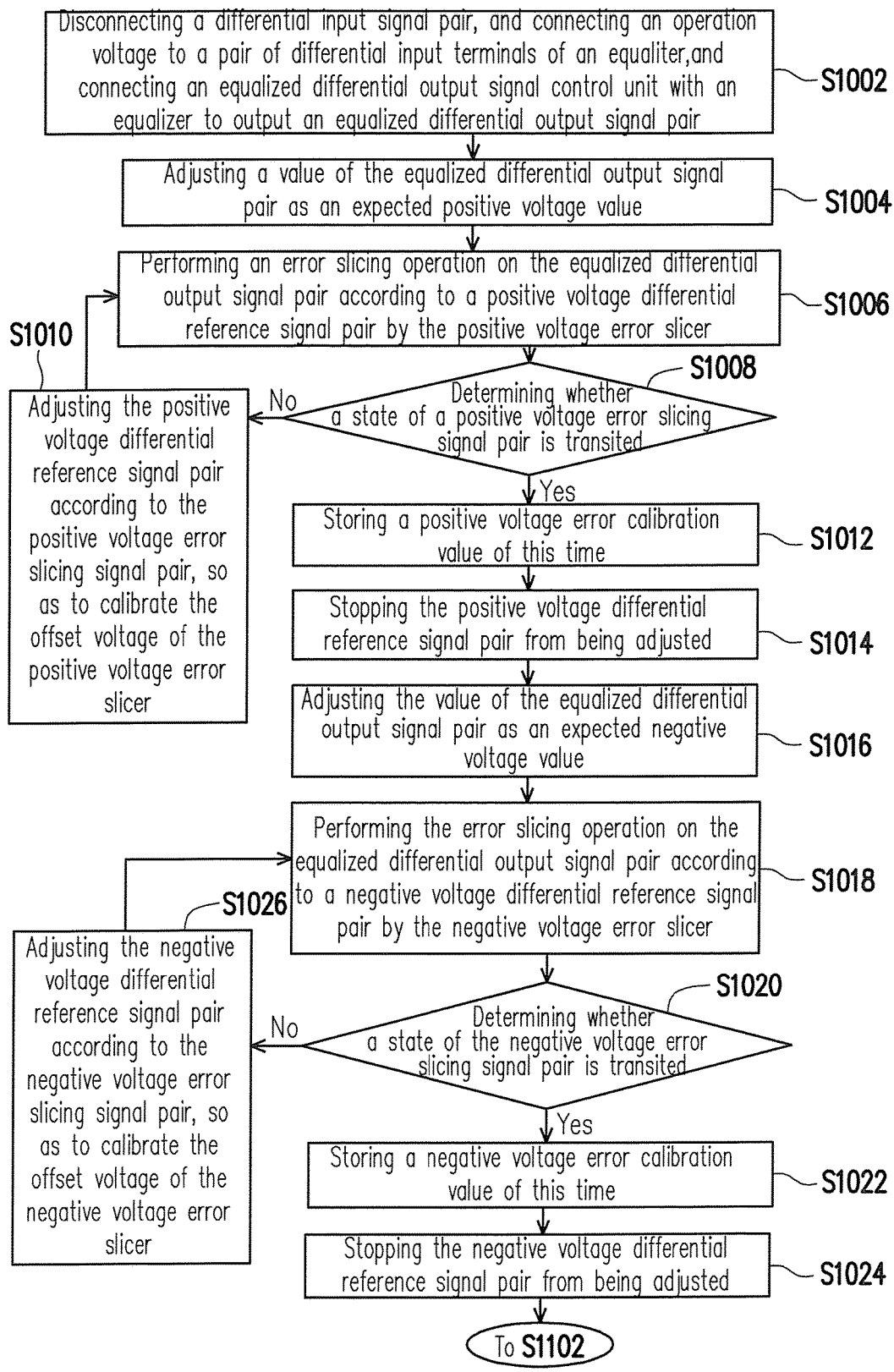
FIGS. 12A and 12B are flowcharts illustrating the calibration method of the slicer apparatus according to another embodiment of the invention.
Figure 12B:
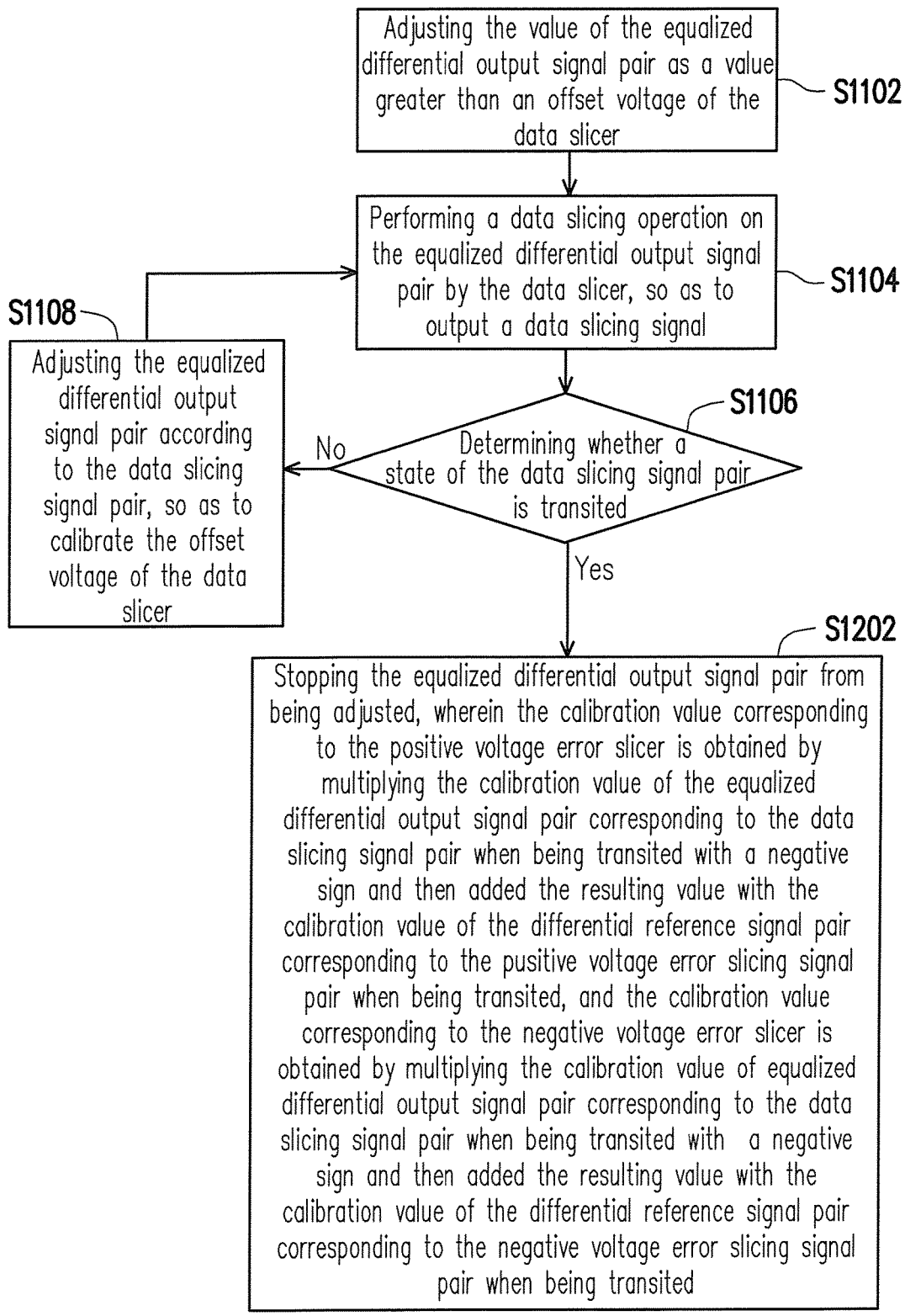

FIGS. 12A and 12B are flowcharts illustrating the calibration method of the slicer apparatus according to another embodiment of the invention. In comparison with the embodiment illustrated in FIG. 10, the slicer apparatus further includes the data slicer, and according to the embodiment described above, the calibration method of the slicer apparatus of the present embodiment further include steps S1102 to steps S1202. After step S1024, the value of the equalized differential output signal pair is adjusted to a value greater than the offset voltage of the data slicer (step S1102). Then, the data slicing operation is performed on the equalized differential output signal pair by the data slicer, so as to output the data slicing signal pair (step S1104). Then, whether the data slicing signal pair is transited is determined (step S1106). If the data slicing signal pair is not transited, the equalized differential output signal pair is adjusted according to the data slicing signal pair, so as to calibrate the offset voltage of the data slicer (step S1108), and then, returning to step S1104, the data slicing operation is performed on the equalized differential output signal pair. On the contrary, if the data slicing signal pair is transited, the equalized differential output signal pair is stopped from being adjusted, while the calibration value corresponding to the positive voltage error slicer is obtained by multiplying the calibration value of the equalized differential output signal pair corresponding to the data slicing signal pair when being transited with a negative sign and then added the resulting value with the calibration value of the differential reference signal pair corresponding to the positive voltage error slicing signal pair when being transited, and the calibration value corresponding to the negative voltage error slicer is obtained by multiplying the calibration value of equalized differential output signal pair corresponding to the data slicing signal pair when being transited with a negative sign and then added the resulting value with the calibration value of the differential reference signal pair corresponding to the negative voltage error slicing signal pair when being transited (step S1202).

To summarize, in the invention, the differential reference signal pair for the error slicer performing the error slicing operation is adjusted to calibrate the offset voltages of the error slicer and the data slicer. Thereby, the compensation of the offset voltages do not have to be performed through disposing the current elements on the output terminals of the slicer as the way implemented in the conventional art, such that neither the reduction of the circuit performance occurs due to increase to the output terminals of the data slicer 504, nor a determination speed of the data slicer 504 is decreased. As a result, the error slicer and the data slicer can output correct signals.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A slicer apparatus, comprising:
   an equalizer, outputs an equalized differential output signal pair;
   a positive voltage error slicer, coupled to the equalizer and performing an error slicing operation on the equalized differential output signal pair according to a first differential reference signal pair, so as to output a first error slicing signal pair;
   a negative voltage error slicer, coupled to the equalizer and performing the error slicing operation on the equalized differential output signal pair according to a second differential reference signal pair, so as to output a second error slicing signal pair;
   a first offset calibration circuit, coupled to the positive voltage error slicer and adjusting the first differential reference signal pair according to the first error slicing signal pair, so as to calibrate an offset voltage of the positive voltage error slicer; and
   a second offset calibration circuit, coupled to the negative voltage error slicer and adjusting the second differential reference signal pair according to the second error slicing signal pair, so as to calibrate the offset voltage of the negative voltage error slicer.

2. The slicer apparatus according to claim 1, wherein the equalizer performs an equalizing operation on an operation voltage, so as to output the equalized differential output signal pair, the slicer apparatus comprises:
   an equalized differential output signal control circuit, provides or drains a current to or from the equalizer.

3. The slicer apparatus according to claim 2, further comprises:
   a first switch, coupled between a differential input signal pair and the equalizer;
   a second switch, coupled between a common contact of the equalizer and the first switch and the operation voltage, wherein the equalizer receives the differential input signal pair through the first switch and receives an output current of the equalized differential output signal control circuit, and during the equalizer being calibrated, the first switch is turned off, and the second switch is turned on, wherein after the calibration operations of the positive voltage error slicer and the negative voltage error slicer are completed, the first switch is turned on, and the second switch is turned off.

4. The slicer apparatus according to claim 2, wherein the equalizer comprises:
   a transistor pair, having a first input terminal, a second input terminal, output terminals, wherein the first input terminal and the second input terminal of the transistor pair receive the operation voltage, and the output terminals of the transistor pair output the equalized differential output signal pair;
   a load unit, coupled between the output terminals of the transistor pair and the operation voltage; and
   a draining current source, coupled to a source of the transistor pair, and the equalized differential output signal control circuit is coupled with sources of the transistor pair to change the current flowing through the transistor pair to adjust the equalized differential output signal pair.

5. The slicer apparatus according to claim 4, wherein the equalized differential output signal control circuit comprises:
   a first current source;
   a second current source; and
   a switching circuit, coupled with the first current source and the second current source and configured to switch a coupling state of the switching circuit to change the current of the transistor pair, wherein when one transistor of the transistor pair is coupled to the first current source, and the other transistor of the transistor pair is coupled to the second current source.

6. The slicer apparatus according to claim 1, wherein each of the error slicers comprises:
   an active load unit;
   a first differential transistor pair, having a first input terminal, a second input terminal, and a common terminal, wherein the first input terminal and the second input terminal of the first differential transistor pair are coupled to the equalized differential output signal pair, the common terminal of the first differential transistor pair is coupled to a ground voltage, and output terminals of the first differential transistor pair are coupled to the active load unit; and
   a second differential transistor pair, having a first input terminal, a second input terminal and a common terminal, wherein the first input terminal and the second input terminal of the second differential transistor pair are coupled to the differential reference signal pair corresponding to each of the error slicers, the common terminal of the second differential transistor pair is coupled to the ground voltage, output terminals of the second differential transistor pair are coupled to the output terminals of the first differential transistor pair, and the error slicing signal pair corresponding to each of the error slicers is output through the active load unit.

7. The slicer apparatus according to claim 6, wherein each of the error slicers further comprises:
   a third switch, coupled between the common terminal of the first differential transistor pair and the ground voltage; and
   a fourth switch, coupled between the common terminal of the second differential transistor pair and the ground voltage, conduction states of the third switch and the fourth switch are controlled by a clock signal.

8. The slicer apparatus according to claim 1, wherein the first offset calibration circuit stops adjusting the first differential reference signal pair when a state of the first error slicing signal pair is transited, and the second offset calibration circuit stops adjusting the second differential reference signal pair when a state of the second error slicing signal pair is transited.

9. The slicer apparatus according to claim 1, wherein each of the offset calibrating circuits comprises:
   a calibration control unit, coupled to the error slicer corresponding to each of the offset calibrating circuits; and
   a compensation unit, coupled with the calibration control unit and the error slicer corresponding to each of the offset calibrating circuits, the calibration control unit controls the compensation unit to adjust the differential reference signal pair corresponding to each of the offset calibrating circuits according to the error slicing signal pair corresponding to each of the offset calibrating circuits.

10. The slicer apparatus according to claim 9, wherein the compensation unit comprises:
  a plurality of voltage-dividing resistors, serially connected between an operation voltage and a ground voltage;
  a plurality of switches, each coupled between the corresponding error slicer and a common contact of the corresponding voltage-dividing resistors and coupled to the calibration control unit;
  a first current source, coupled between a common contact of the corresponding voltage-dividing resistors and the ground voltage and coupled to the calibration control unit; and
  a second current source, coupled between a common contact of the corresponding voltage-dividing resistors and the ground voltage and coupled to the calibration control unit, wherein the calibration control unit controls conduction states of the switches according to the error slicing signal pair corresponding to each of the offset calibrating circuits and currents of the first current source and the second current source to adjust the differential reference signal pair corresponding to each of the offset calibrating circuits.

11. The slicer apparatus according to claim 1, wherein each of the offset calibrating circuits comprises a compensation unit coupled to the error slicer corresponding to each of the offset calibrating circuits, and the slicer apparatus further comprises:
  a data slicer, coupled to the equalizer and performs a data slicing operation on the equalized differential output signal pair, so as to output a data slicing signal pair; and
  a data slicer calibrating unit, coupled with the data slicer and the compensation unit of each of the offset calibrating circuits, the data slicer calibrating unit controlling the compensation unit to adjust the differential reference signal pair corresponding to each of the offset calibrating circuits according to the data slicing signal pair, so as to calibrate an offset voltage of the data slicer.

12. The slicer apparatus according to claim 11 wherein the data slicer comprises:
  an active load unit; and
  a differential transistor pair, having a first input terminal and a second input terminal, common terminal, wherein the first input terminal and the second input terminal of the differential transistor pair are coupled to the equalized differential output signal pair, a common terminal of the differential transistor pair is coupled to a ground voltage, output terminals of the differential transistor pair are coupled to the active load unit, and the data slicing signal pair is output through the active load unit.

13. The slicer apparatus according to claim 12, wherein the data slicer comprises:
  a switch, coupled between the common terminal of the differential transistor pair and the ground voltage, and a conduction state of the switch is controlled by a clock signal.

14. The slicer apparatus according to claim 11, wherein the data slicer calibrating unit stops adjusting the equalized differential output signal pair when a state of the data slicing signal pair is transited.

15. The slicer apparatus according to claim 11, wherein the compensation unit comprises:
  a plurality of voltage-dividing resistors, serially connected between an operation voltage and a ground voltage;
  a plurality of switches, each coupled between the corresponding error slicer and a common contact of the corresponding voltage-dividing resistors and coupled to the data slicer calibrating unit;
  a first current source, coupled between the common contact of the corresponding voltage-dividing resistors and the ground voltage and coupled to the data slicer calibrating unit; and
  a second current source, coupled between the common contact of the corresponding voltage-dividing resistors and the ground voltage and coupled to the data slicer calibrating unit, wherein the data slicer calibrating unit controls conduction states of the switches and currents of the first current source and the second current source to adjust the differential reference signal pair corresponding to each of the offset calibrating circuits according to the error slicing signal pair corresponding to each of the offset calibrating circuits.

16. The slicer apparatus according to claim 11, wherein each of the offset calibrating circuits further comprises:
  a calibration control unit, coupled with the compensation unit and the error slicer corresponding to each of the offset calibrating circuits, wherein the calibration control unit controls the compensation unit to adjust the differential reference signal pair corresponding to each of the offset calibrating circuits according to the error slicing signal pair corresponding to each of the offset calibrating circuits.

17. The slicer apparatus according to claim 16, wherein the compensation unit comprises:
  a plurality of voltage-dividing resistors, serially connected between an operation voltage and a ground voltage;
  a plurality of switches, each coupled between the corresponding error slicer and a common contact of the corresponding voltage-dividing resistors and coupled to the calibration control unit;
  a first current source, coupled between the common contact of the corresponding voltage-dividing resistors and the ground voltage and coupled to the calibration control unit; and
  a second current source, coupled between the common contact of the corresponding voltage-dividing resistors and the ground voltage and coupled to the calibration control unit, wherein the calibration control unit controls conduction states of the switches and currents of the first current source and the second current source to adjust the differential reference signal pair corresponding to each of the offset calibrating circuits according to the error slicing signal pair corresponding to each of the offset calibrating circuits.

18. A calibration method of a slicer apparatus comprising a positive voltage error slicer and a negative voltage error slicer, the calibration method comprising:
  outputting an equalized differential output signal pair;
  adjusting a value of the equalized differential output signal pair as an expected positive voltage value;
  performing an error slicing operation on the equalized differential output signal pair according to a positive voltage differential reference signal pair by the positive voltage error slicer, so as to output a positive voltage error slicing signal pair;

determining whether a state of positive voltage error slicing signal pair is transited;

if the state of the positive voltage error slicing signal pair is not transited, adjusting the positive voltage differential reference signal pair according to the positive voltage error slicing signal pair, so as to calibrate an offset voltage of the positive voltage error slicer;

if the state of the positive voltage error slicing signal pair is transited, storing a positive voltage error calibration value and stopping the positive voltage differential reference signal pair from being adjusted;

adjusting the value of the equalized differential output signal pair as an expected negative voltage value;

performing the error slicing operation on the equalized differential output signal pair according to a negative voltage differential reference signal pair by the negative voltage error slicer, so as to output a negative voltage error slicing signal pair;

determining whether a state of the negative voltage error slicing signal pair is transited;

if the state of the negative voltage error slicing signal pair is not transited, adjusting the negative voltage differential reference signal pair according to the negative voltage error slicing signal pair, so as to calibrate the offset voltage of the negative voltage error slicer; and if the state of the negative voltage error slicing signal pair is transited, storing a negative voltage error calibration value and stopping the negative voltage differential reference signal pair from being adjusted.

19. The calibration method according to claim 18, wherein the slicer apparatus further comprises a data slicer, and the calibration method further comprises:

performing a data slicing operation on the equalized differential output signal pair by the data slicer, so as to output a data slicing signal pair;

determining whether a state of the data slicing signal pair is transited;

if the state of the data slicing signal pair is not transited, adjusting the equalized differential output signal pair according to the data slicing signal pair, so as to calibrate the offset voltage of the data slicer; and if the state of the data slicing signal pair is transited, stopping the equalized differential output signal pair from being adjusted, wherein a calibration value corresponding to the positive voltage error slicer is obtained by multiplying a calibration value of the equalized differential output signal pair corresponding to the data slicing signal pair when being transited with a negative sign and then added the resulting value with a calibration value of the differential reference signal pair corresponding to the positive voltage error slicing signal pair when being transited, and a calibration value corresponding to the negative voltage error slicer is obtained by multiplying the calibration value of the equalized differential output signal pair corresponding to the data slicing signal pair when being transited with a negative sign and then added the resulting value with the calibration value of the differential reference signal pair corresponding to the negative voltage error slicing signal pair when being transited.

20. A calibration method of a slicer apparatus comprising a positive voltage error slicer, a negative voltage error slicer and a data slicer, the calibration method comprising outputting an equalized differential output signal pair;

adjusting a value of the equalized differential output signal pair to a value greater than an offset voltage of the data slicer;

performing a data slicing operation on the equalized differential output signal pair by the data slicer, so as to output a data slicing signal pair;

determining whether a state of a data slicing signal pair is transited;

if the state of the data slicing signal pair is not transited, adjusting the equalized differential output signal pair according to the data slicing signal pair, so as to calibrate the offset voltage of the data slicer; and if the state of the data slicing signal pair is transited, stopping the equalized differential output signal pair from being adjusted and adjusting a positive voltage differential reference signal pair and a negative voltage differential reference signal pair according to a calibration value for calibrating the equalized differential output signal pair, so as to calibrate the offset voltage of the data slicer, wherein an error slicing operation is performed on the equalized differential output signal pair respectively according to the positive voltage differential reference signal pair and the negative voltage differential reference signal pair by the positive voltage error slicer and the negative voltage error slicer.

* * * * *